Figure 1:
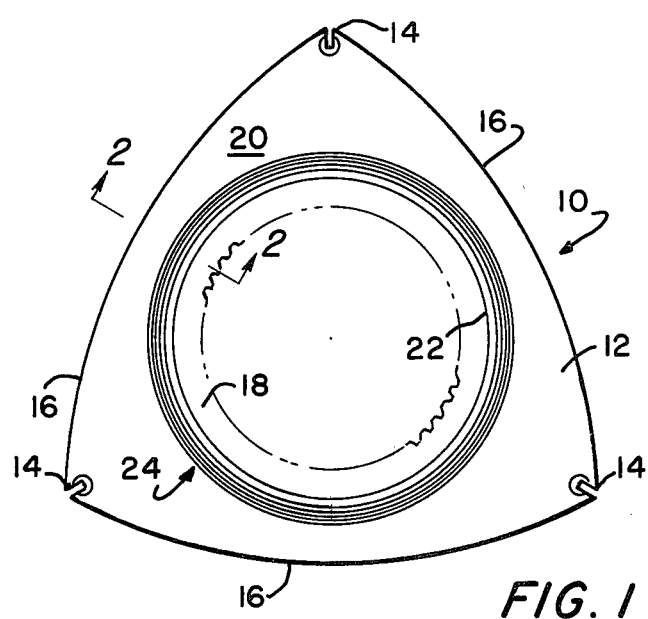

United States Patent [19]

Black

[11] 4,106,780
[45] Aug. 15, 1978

[54] SEAL CARRIER FOR ROTARY PISTON ENGINE

[75] Inventor: Arthur L. Black, Corning, N.Y.

[73] Assignee: Ingersoll-Rand Company, Woodcliff Lake, N.J.

[21] Appl. No.: 845,475

[22] Filed: Oct. 26, 1977

[51] Int. Cl.$^2$ .................. F16J 15/34; F01C 19/00
[52] U.S. Cl. .................. 277/81 P; 277/177; 277/186; 418/142
[58] Field of Search .............. 277/81 P, 173–177, 277/181–186; 418/142, 92, 94

[56] References Cited

U.S. PATENT DOCUMENTS

| | | | |
|---|---|---|---|
| 3,171,590 | 3/1965 | Bentele et al. | 418/94 X |
| 3,575,541 | 4/1971 | Hamada | 418/142 |
| 3,822,973 | 7/1974 | Prasse et al. | 418/142 |
| 3,853,440 | 12/1974 | Green | 418/142 |
| 3,909,015 | 9/1975 | Kasahara | 277/81 P |
| 3,924,979 | 12/1975 | Rose | 418/142 |

*Primary Examiner*—Robert S. Ward, Jr.
*Attorney, Agent, or Firm*—Bernard J. Murphy

[57] ABSTRACT

In the embodiment shown, the carrier is of annular configuration having a width of less than the width of a side-seal groove in a rotor, in which groove the carrier is slidably inserted. As the rotor is subject to distortion, an O-ring is interpositioned between the carrier and the groove resiliently to isolate the carrier from such rotor distortion. The O-ring is fitted into an annular recess formed in the outside-diameter surface of the carrier.

6 Claims, 2 Drawing Figures

SEAL CARRIER FOR ROTARY PISTON ENGINE

This invention pertains to sealing means, and in particular to carriers for seals which are received in side surfaces of rotary pistons, in seal grooves formed in the pistons therefor, for sealing the side surfaces thereat.

Rotary piston or rotor side seals and carriers, of the general type to which the invention pertains, are well known in the prior art. Some of the more exemplary types are set forth in U.S. Pat. Nos. 3,171,590, issued Mar. 2, 1965, to M. Bentele, et al, for "Oil Seal Construction for Rotary Combustion Engines"; 3,797,976, issued Mar. 19, 1974, to Moriya, et al, for "Oil Seal Device for Rotary Piston Internal Combustion Engine"; 3,941,523, issued Mar. 2, 1976, to Shin, et al, for "Multiple Oil Seal Arrangement for Rotary Piston Internal Combustion Engine"; and 3,947,046, issued Mar. 30, 1976, to Maruyama, et al, for "Oil Seal Ring for Internal Combustion Engine".

The sealing devices — seals and seal carriers — disclosed in such prior art are, per se, efficiently designed. However, typically such sealing devices are carried in grooves provided therefor in side surfaces of rotors and, necessarily, the rotors are subject to distortion. Accordingly, the seals and/or seal carriers which are nested in the side-surface grooves experience distortion in common with the rotors and, as a consequence, lose their optimum configuration and efficiency.

Heretofore, the prior art has failed to teach any means for isolating side-rotor sealing devices from distortions of the rotor. It is an object of this invention, then, to set forth such distortion-isolating means.

Particularly, it is an object of this invention to disclose, for use with a rotor which has a seal groove of given width formed in a surface thereof, which rotor is subject to distortion, a seal carrier, for slidable insertion thereof into said groove, for carrying a seal for sealing the rotor along said groove; said carrier having a width of less than said given width, to accommodate such insertion thereof; wherein the improvement comprises means engaging said carrier, for effecting an interpositioning thereof between the groove and said carrier, for resiliently isolating said carrier from distortion of the rotor.

Another object of this invention is to set forth, for use with a rotor which has a seal groove of given width formed in a surface thereof, which rotor is subject to distortion, a seal carrier, for slidable insertion thereof into said groove, for carrying a seal for sealing the rotor along said groove; said carrier having a width of less than said given width, to accommodate such insertion thereof; wherein the improvement comprises a recess, formed in a surface of said carrier, for nesting therein a resilient element to effect an interpositioning of such element between the groove and said carrier for resiliently isolating said carrier from rotor distortion.

It is yet a further object of this invention to set forth, in combination, a rotor which has a seal groove of given cross-sectional dimension formed in a surface thereof, which rotor is subject to distortion, and a seal carrier, slidably nested in said groove, for carrying a seal for sealing the rotor along said groove; said carrier having a cross-sectional dimension of less than said given dimension facilitating slidable nesting thereof in said groove; wherein the improvement comprises resilient means interpositioned between said groove and said carrier for resiliently isolating said carrier from distortion of said rotor.

Figure 2:
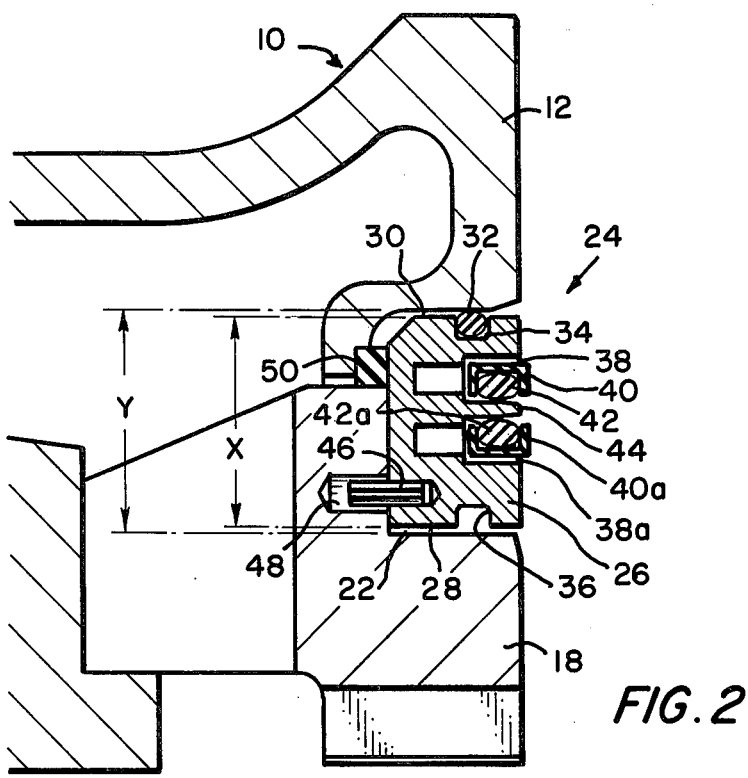

Further objects of this invention, as well as the novel features thereof, will become more apparent by reference to the following description, taken in conjunction with the accompanying Figures, in which:

FIG. 1 is an elevational view of a rotor, of the type used in rotary, internal combustion engines; and FIG. 2 is a cross-sectional view, in greater scale than FIG. 1, taken along section 2—2 of FIG. 1, showing an embodiment of the invention.

As shown in FIG. 1, a rotor 10 — for an internal combustion engine, or the like — comprises a generally triangular body 12 having three apexes 14 formed of joined convex surfaces 16. Engaged therewith is a ring gear or thrust adapter 18. Each side wall 20 (only one being shown) of the rotor 10 has an annular seal groove 22 formed therein which receives a sealing means 24.

What has been described thus far is substantially conventional, such a similar arrangement being disclosed in the aforementioned U.S. Pat. No. 3,171,590, for example.

FIG. 2 shows in greater detail the improvement comprised by the invention, where the sealing means 24 comprehends a seal carrier 26 which is resiliently isolated from the rotor 10.

Seal carrier 26 comprises an annular element having inside and outside diameter surfaces 28 and 30, respectively, which therebetween define a cross-sectional dimension "X" of the carrier which is less than the cross-sectional dimension "Y" of seal groove 22. Consequently, of course, the carrier 26 can be freely and slidably fitted into the seal groove 22, and to retain the carrier 26 in the groove 22 while resiliently isolating it from rotor distortions, an O-ring seal 32 is interposed between the carrier 26 and the groove 22. Carrier 26 has an annular recess 34, in surface 30, in which the O-ring seal 32 is nested. Another annular recess 36 is formed in surface 28 of the carrier 26 and, patently, in alternative practices of the invention, an O-ring seal could be nested in recess 36 — in lieu of seal 32 (in recess 34), or in addition to seal 32.

Carrier 26 has a pair of parallel, annular channels 38 and 38a formed therein which receive sealing elements 40 and 40a. The latter are U-shaped in cross-section resiliently to confine therein further O-ring seals 42 and 42a. Channels 38 and 38a define a land 44 therebetween, and seals 42 and 42a resiliently engage the land surfaces.

The rear, back face of the carrier 26 has an anti-rotation dowel 46 projecting therefrom, and the interfacing surface of the ring gear 18 has an oversized bore 48 in which, loosely, to receive and orient the dowel. Finally, an elastomeric seal 50 is sealingly arranged between the back face of the carrier and the adjacent surface of the rotor body 12.

As will be evident, the disparity of dimension between cross-sections "X" and "Y" of the carrier 26 and groove 22 is such as to insure that, with thermal or mechanical distortion of rotor 10, surfaces 28 and/or 30 of carrier 26 will not engage the thereadjacent surfaces of the groove 22. The O-ring seal 32 bridges across the dimensional clearance, from the outside diameter of the carrier 26. In this way, then, according to my teaching, the carrier 26 is effectively and resiliently isolated from all rotor distortion.

As exemplified in the aforementioned U.S. Pat. No. 3,947,046, it is known to define seal channels in the side wall of the rotor. Yet, in the light of rotor distortion, it is my teaching to arrange the seal carrier between an inside diameter of the rotor body 12 and an outside diameter of the ring gear 18; here, as contrasted with any location further outward on the rotor side wall, for instance, the thermal and mechanical distortions are less pronounced.

In the embodiment shown, an O-ring 32 is shown employed; so also, the seal 50 at the rear face of the carrier 26 is described as elastomeric. Clearly, seals of other materials, for instance flexible steel, could be used with equally satisfactory results.

Hence, while I have described my invention in connection with a specific embodiment thereof, it is to be clearly understood that this is done only by way of example, and not as a limitation to the scope of my invention as set forth in the objects thereof and in the appended claims.

I claim:

1. In combination with a rotor which has a seal groove of given width formed by parallel groove surfaces in a surface of said rotor, which rotor is subject to radial and axial, mechanical or dynamic and thermal distortions; a seal carrier received by said groove for carrying a seal for sealing the rotor along said groove; said carrier having a width of less than said given width, to accommodate such groove reception of said carrier in a spaced-apart disposition from thereadjacent said parallel surfaces of said groove; wherein the improvement comprises:

means engaging said carrier, effecting an interpositioning thereof between at least one of said surfaces of said groove and said carrier, for resiliently isolating said carrier from at least radial distortions of the rotor.

2. A seal carrier, according to claim 1, wherein: said isolating means is resilient.

3. A seal carrier, according to claim 1, wherein: said isolating means is elastomeric.

4. A seal carrier, according to claim 2, wherein: said isolating means is replaceably borne by said carrier.

5. A seal carrier, according to claim 4, wherein: said carrier has a recess formed therein; and said isolating means comprises an O-ring nested in said recess.

6. A seal carrier, according to claim 4, wherein: said carrier is of annular configuration, having inside and outside annular surfaces;

at least one of said carrier annular surfaces has an annular recess formed therein; and said isolating means comprises an O-ring nested in said annular recess.

* * * * *